US007692341B2

(12) United States Patent
Lafontaine et al.

(10) Patent No.: US 7,692,341 B2
(45) Date of Patent: Apr. 6, 2010

(54) COMPACT HIGH POWER ALTERNATOR

(75) Inventors: Charles Y. Lafontaine, Berthoud, CO (US); Harold C. Scott, Lafayette, CO (US)

(73) Assignee: Magnetic Applications, Inc., Lafayette, CO (US)

( * ) Notice: Subject to any disclaimer, the term of this patent is extended or adjusted under 35 U.S.C. 154(b) by 0 days.

(21) Appl. No.: 11/710,239

(22) Filed: Feb. 22, 2007

(65) Prior Publication Data
US 2007/0210656 A1   Sep. 13, 2007

Related U.S. Application Data

(63) Continuation of application No. 11/347,777, filed on Feb. 2, 2006, now Pat. No. 7,327,123.

(60) Provisional application No. 60/775,904, filed on Feb. 22, 2006, provisional application No. 60/649,720, filed on Feb. 2, 2005.

(51) Int. Cl.
*H02K 9/00* (2006.01)
(52) U.S. Cl. ....................................... 310/58
(58) Field of Classification Search ............. 310/71, 310/58, 60 A, 64
See application file for complete search history.

(56) References Cited

U.S. PATENT DOCUMENTS

| 3,564,388 | A | 2/1971 | Nolf |
| 3,757,230 | A | 9/1973 | Keeney |
| 4,455,598 | A | 6/1984 | Andre et al. |
| 4,695,776 | A | 9/1987 | Dishner et al. |
| 4,885,493 | A | 12/1989 | Gokhale |
| 5,625,276 | A | 4/1997 | Scott et al. |
| 5,705,917 | A | 1/1998 | Scott et al. |
| 5,828,147 | A | * 10/1998 | Best et al. .................. 310/71 |
| 5,886,504 | A | 3/1999 | Scott et al. |
| 5,900,722 | A | 5/1999 | Scott et al. |
| 5,929,611 | A | 7/1999 | Scott et al. |
| 6,018,200 | A | 1/2000 | Anderson et al. |
| 6,034,511 | A | 3/2000 | Scott et al. |

(Continued)

FOREIGN PATENT DOCUMENTS

DE    21 19 525 A1    2/1972

(Continued)

*Primary Examiner*—Nguyen N Hanh
(74) *Attorney, Agent, or Firm*—Lucius Lockwood; David E. Rogers; Squire, Sanders & Dempsey L.L.P.

(57) ABSTRACT

A compact, high power, power conversion apparatus including a rotor and a stator. The rotor includes a cylindrical casing, and a predetermined number of permanent magnets disposed on the casing, and is adapted for rotation about the axis of the casing. The stator includes a core and a plurality of sets of conductive windings, each set including a predetermined number of individual conductive windings and associated with an electrical phase. A respective collecting conductor is associated with each set of conductive windings, with each individual conductive winding of the set being electrically connected to the associated collecting conductor. The respective collecting conductors are disposed in a coolant flow path a coolant flow path directing coolant into contact with the stator windings, electrically isolated from each other and spaced apart from each other and from the windings. Collecting conductors in the form of continuous rings and in the form of a plurality of arcs are disclosed.

30 Claims, 15 Drawing Sheets

U.S. PATENT DOCUMENTS

| | | |
|---|---|---|
| 6,369,473 B1 * | 4/2002 | Baumeister et al. ............ 310/71 |
| 6,376,947 B1 * | 4/2002 | Tateishi ..................... 310/68 R |
| 6,441,522 B1 | 8/2002 | Scott |
| 6,674,195 B2 * | 1/2004 | Yagyu et al. .................. 310/71 |
| 6,784,575 B2 * | 8/2004 | Okuda ......................... 310/58 |
| 7,061,149 B2 * | 6/2006 | Crane .......................... 310/71 |
| 7,122,923 B2 * | 10/2006 | Lafontaine et al. ............ 310/58 |
| 7,176,658 B2 | 2/2007 | Quazi et al. |

FOREIGN PATENT DOCUMENTS

| | | |
|---|---|---|
| DE | 100 48 491 A1 | 4/2002 |
| EP | 1 176 696 A2 | 1/2002 |
| EP | 1 184 960 A1 | 3/2002 |
| JP | 58 072358 A | 4/1983 |
| JP | 06 233483 A | 8/1994 |

* cited by examiner

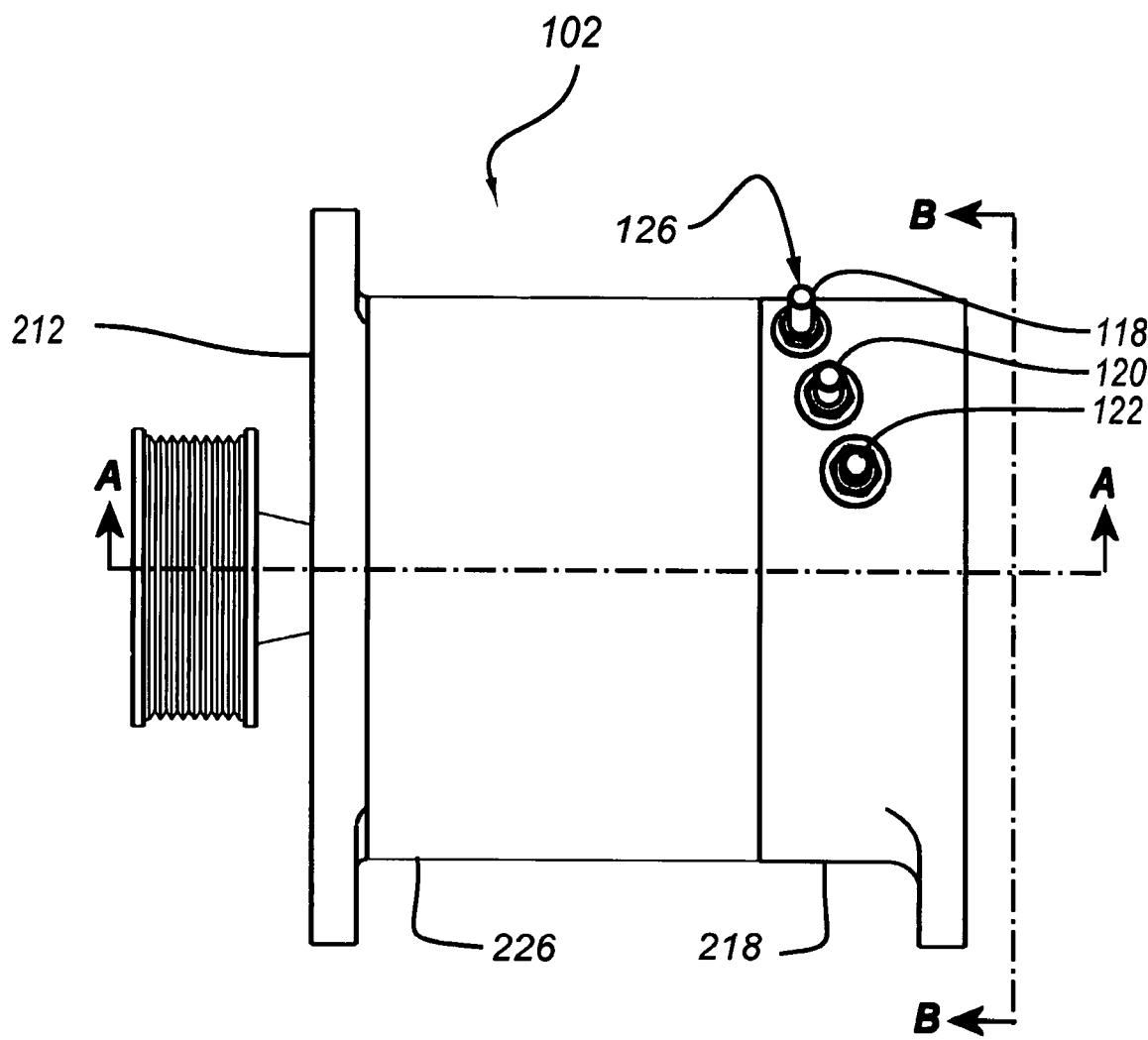

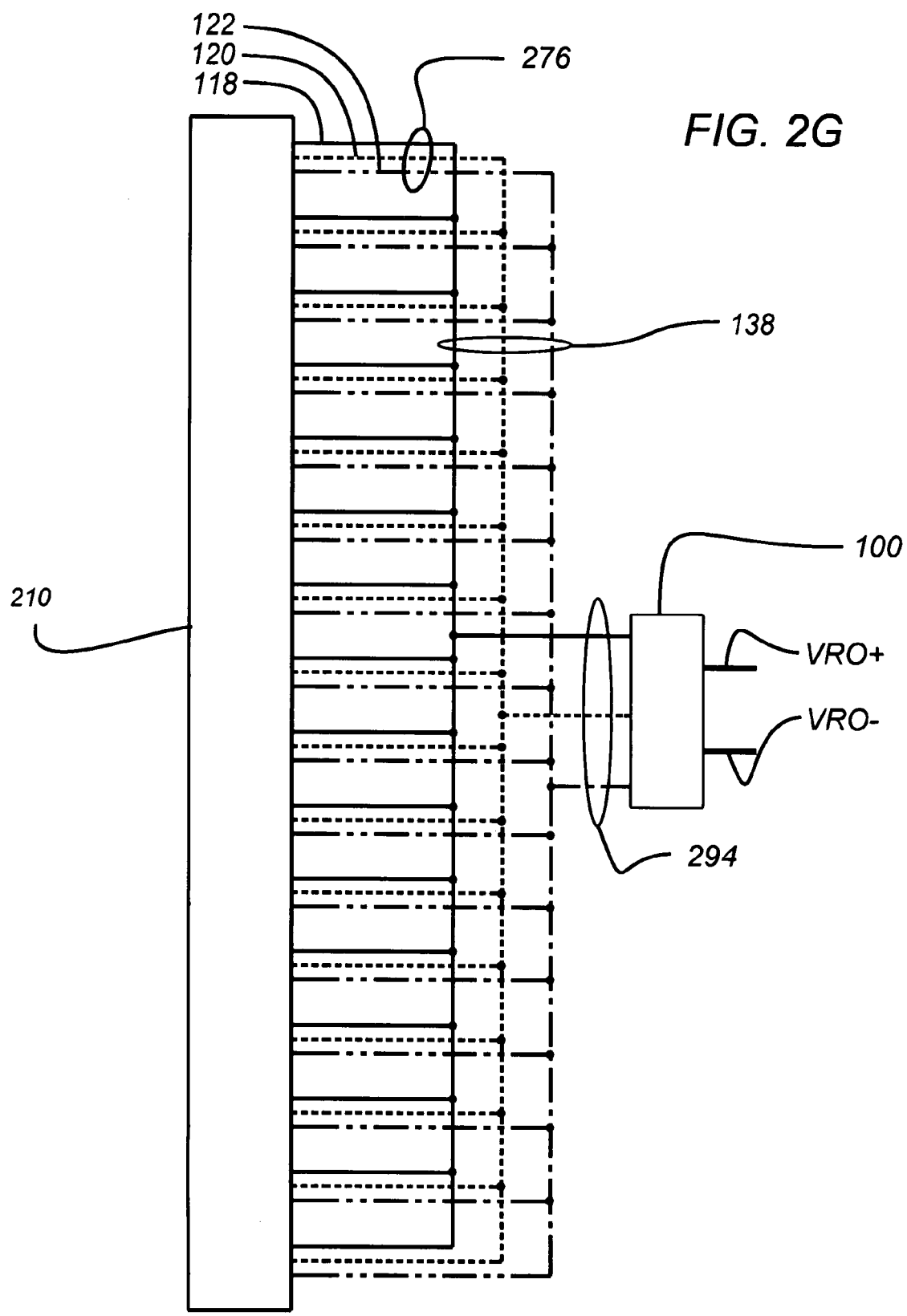

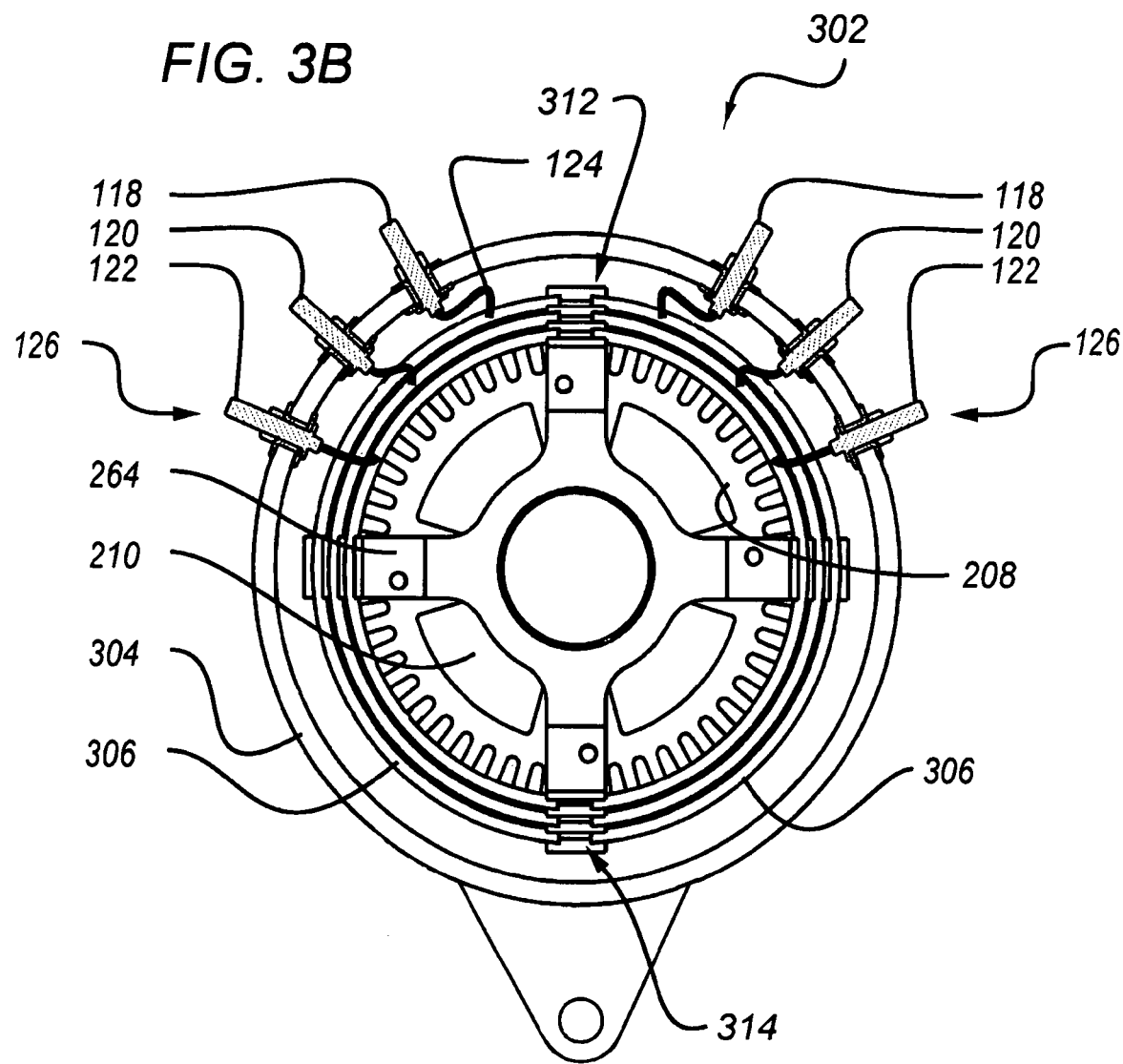

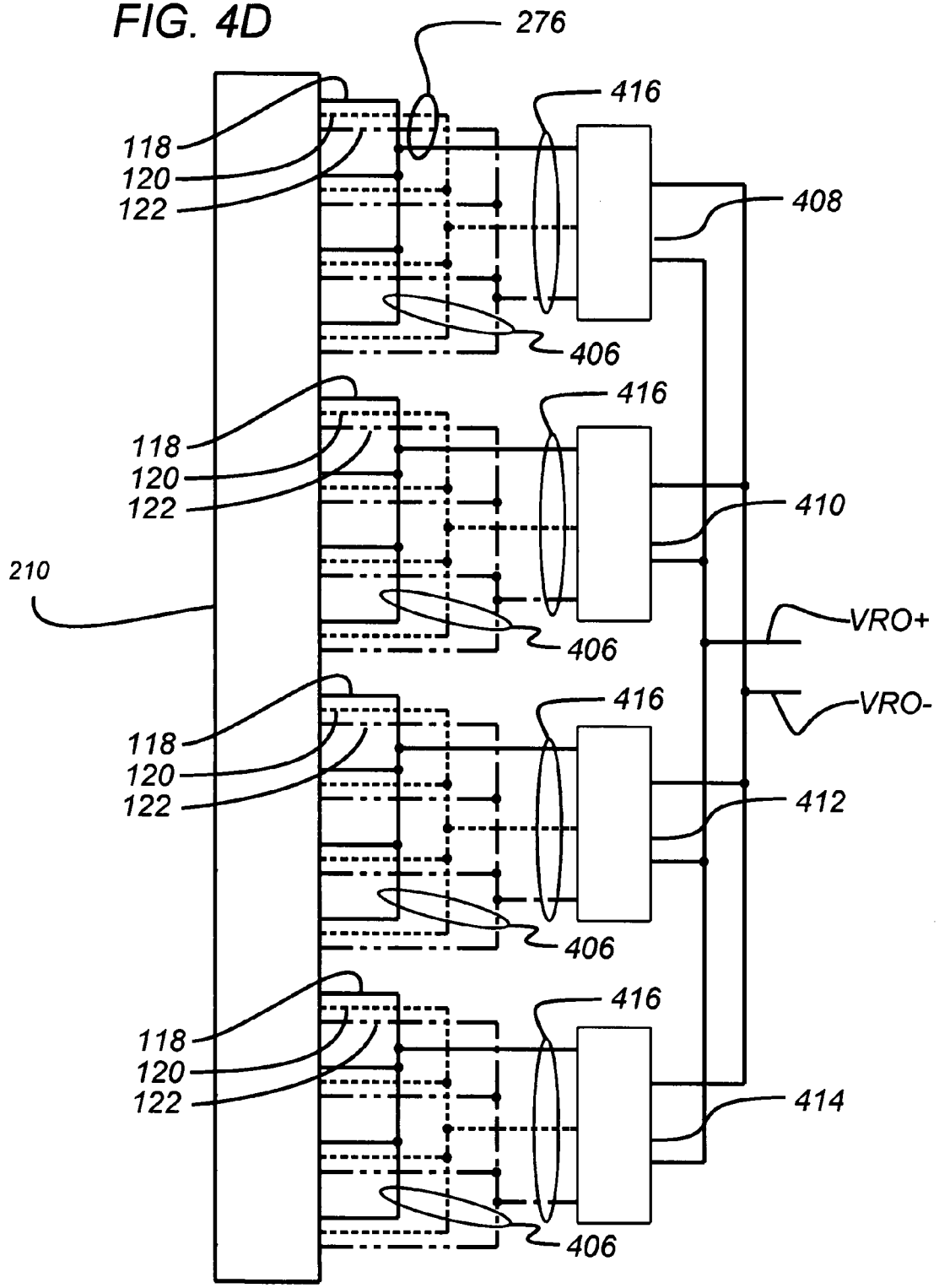

COMPACT HIGH POWER ALTERNATOR

CROSS REFERENCE TO RELATED APPLICATIONS

This application claims priority to U.S. provisional application No. 60/775,904, filed Feb. 22, 2006, in the name of Charles Y. Lafontaine et al. and claims priority to and is a continuation of U.S. patent application Ser. No. 11/347,777, filed Feb. 2, 2006, now U.S. Pat. No. 7,327,123 which claims priority to U.S. provisional application No. 60/649,720, filed Feb. 2, 2005, all of which are incorporated herein by reference in their entirety for all purposes.

DESCRIPTION OF THE INVENTION

The present invention relates to voltage and current control systems for machines for converting between mechanical and electrical energy, such as brushless AC generators, and in particular to a control system for a compact permanent magnet high power alternator, such as a compact permanent magnet high power alternator suitable for automotive use.

BACKGROUND OF THE INVENTION

An alternator typically comprises a rotor mounted on a rotating shaft and disposed concentrically relative to a stationary stator. The rotor is typically disposed within the stator. However, the stator may be alternatively positioned concentrically within the rotor. An external energy source, such as a motor or turbine, commonly drives the rotating element, directly or through an intermediate system such as a pulley belt. Both the stator and the rotor have a series of poles. Either the rotor or the stator generates a magnetic field, which interacts with windings on the poles of the other structure. As the magnetic field intercepts the windings, an electric field is generated, which is provided to a suitable load. The induced electric field (which is commonly known as a voltage source) is typically applied to a rectifier, sometimes regulated, and provided as a DC output power source. The induced current is typically applied to a rectifier, sometimes regulated, and provided as a DC output power source. In some instances, a regulated DC output signal is applied to a DC to AC inverter to provide an AC output.

Conventionally, alternators employed in motor vehicle applications typically comprise: a housing, mounted on the exterior of an engine; a stator having 3-phase windings housed in the housing, a belt-driven claw-pole type (e.g. Lundell) rotor rotatably supported in the housing within the stator. However, to increase power output the size of the conventional alternator must be significantly increased. Accordingly, space constraints in vehicles tend to make such alternators difficult to use in high output, e.g. 5 KW, applications, such as for powering air conditioning, refrigeration, or communications apparatus.

In addition, the claw-pole type rotors, carrying windings, are relatively heavy (often comprising as much as three quarters of the total weight of the alternator) and create substantial inertia. Such inertia, in effect, presents a load on the engine each time the engine is accelerated. This tends to decrease the efficiency of the engine, causing additional fuel consumption. In addition, such inertia can be problematical in applications such as electrical or hybrid vehicles. Hybrid vehicles utilize a gasoline engine to propel the vehicle at speeds above a predetermined threshold, e.g. 30 Kph (typically corresponding to a range of RPM where the gasoline engine is most efficient). Similarly, in a so-called "mild hybrid," a starter-generator is employed to provide an initial burst of propulsion when the driver depresses the accelerator pedal, facilitating shutting off the vehicle engine when the vehicle is stopped in traffic to save fuel and cut down on emissions. Such mild hybrid systems typically contemplate use of a high-voltage (e.g. 42 volts) electrical system. The alternator in such systems must be capable of recharging the battery to sufficient levels to drive the starter-generator to provide the initial burst of propulsion between successive stops, particularly in stop and go traffic. Thus, a relatively high power, low inertia alternator is needed.

In general, there is in need for additional electrical power for powering control and drive systems, air conditioning and appliances in vehicles. This is particularly true of vehicles for recreational, industrial transport applications such as refrigeration, construction applications, and military applications.

For example, there is a trend in the motor vehicle industry to employ intelligent electrical, rather than mechanical or hydraulic control and drive systems to decrease the power load on the vehicle engine and increased fuel economy. Such systems may be employed, for example, in connection with steering servos (which typically are active only a steering correction is required), shock absorbers (using feedback to adjust the stiffness of the shock absorbers to road and speed conditions), and air conditioning (operating the compressor at the minimum speed required to maintain constant temperature). The use of such electrical control and drive systems tends to increase the demand on the electrical power system of the vehicle.

Similarly, it is desirable that mobile refrigeration systems be electrically driven. For example, driving the refrigeration system at variable speeds (independently of the vehicle engine rpm) can increase efficiency. In addition, with electrically driven systems the hoses connecting the various components, e.g. the compressor (on the engine), condenser (disposed to be exposed to air), and evaporation unit (located in the cold compartment), can be replaced by an electrically driven hermetically sealed system analogous to a home refrigerator or air-conditioner. Accordingly, it is desirable that a vehicle electrical power system in such application be capable of providing the requisite power levels for an electrically driven unit.

There is also a particular need for a "remove and replace" high power alternator to retrofit existing vehicles. Typically only a limited amount of space is provided within the engine compartment of the vehicle to accommodate the alternator. Unless a replacement alternator fits within that available space, installation is, if possible, significantly complicated, typically requiring removal of major components such as radiators, bumpers, etc. and installation of extra brackets, belts and hardware. Accordingly, it is desirable that a replacement alternator fit within the original space provided, and interfaces with the original hardware.

In general, permanent magnet alternators are well known. Such alternators use permanent magnets to generate the requisite magnetic field. Permanent magnet generators tend to be much lighter and smaller than traditional wound field generators. Examples of permanent magnet alternators are described in U.S. Pat. No. 5,625,276 issued to Scott et al on Apr. 29, 1997; U.S. Pat. No. 5,705,917 issued to Scott et al on Jan. 6, 1998; U.S. Pat. No. 5,886,504 issued to Scott et al on Mar. 23, 1999; U.S. Pat. No. 5,929,611 issued to Scott et al on Jul. 27 1999; U.S. Pat. No. 6,034,511 issued to Scott et al on Mar. 7, 2000; and U.S. Pat. No. 6,441,522 issued to Scott on Aug. 27, 2002.

Particularly light and compact permanent magnet alternators can be implemented by employing an "external" permanent magnet rotor and an "internal" stator. The rotor comprises a hollow cylindrical casing with high-energy permanent magnets disposed on the interior surface of the cylinder. The stator is disposed concentrically within the rotor casing, and suitably comprises a soft magnetic core, and conductive windings. The core is generally cylindrical width an axially crenellated outer peripheral surface with a predetermined number of equally spaced teeth and slots. The conductive windings (formed of a suitably insulated electrical conductor, such as varnished copper motor wire), are wound through a respective slot, outwardly along the side face of the core around a predetermined number of teeth, then back through another slot. The portion of the windings extending outside of the crenellation slots along the side faces of the core are referred to herein as end turns. Rotation of the rotor about the stator causes magnetic flux from the rotor magnets to interact with and induce current in the stator windings. An example of such an alternator is described in, for example, the aforementioned U.S. Pat. No. 5,705,917 issued to Scott et al on Jan. 6, 1998 and U.S. Pat. No. 5,92,611 issued to Scott et al on Jul. 27 1999.

The power supplied by a permanent magnet generator varies significantly according to the speed of the rotor. In many applications, changes in the rotor speed are common due to, for example, engine speed variations in an automobile, or changes in load characteristics. Accordingly, an electronic control system is typically employed. An example of a permanent magnet alternator and control system therefore is described in the aforementioned U.S. Pat. No. 5,625,276 issued to Scott et al on Apr. 29, 1997. Examples of other control systems are described in U.S. Pat. No. 6,018,200 issued to Anderson, et al. on Jan. 25, 2000. Other examples of control systems are described in commonly owned co-pending U.S. patent applications Ser. No. 10/860,393 by Quazi et al, entitled "Controller for Permanent Magnet Alternator" and filed on Jun. 6, 2004 and Ser. No. 11/347,777 by Faber man et al (including the present inventors), entitled "Controller for AC Generator" and filed Feb. 2, 2006. The aforementioned commonly owned applications are hereby incorporated by reference as if set forth verbatim herein.

The need to accommodate a wide range of rotor speeds is particularly acute in motor vehicle applications. For example, large diesel truck engines typically operate from 600 RPM at idle, to 2600 RPM at highway speeds, with occasional bursts to 3000 RPM, when the engine is used to retard the speed of the truck. Thus the alternator system is subject to a 5:1 variation in RPM. Light duty diesels operate over a somewhat wider range, e.g. from 600 to 4,000 RPM. Alternators used with gasoline vehicle engines typically must accommodate a still wider range of RPM, e.g. from 600 to 6500 RPM. In addition, the alternator must accommodate variations in load, i.e., no load to full load. Thus the output voltage of a permanent magnet alternator used with gasoline vehicle engines can be subject to a 12:1 variation. Accordingly, if a conventional permanent magnet alternator is required to provide operating voltage (e.g. 12 volts) while at idle with a given load, it will provide multiples of the operating voltage, e.g. ten (10) times that voltage, at full engine RPM with that load, e.g. 120 volts. Where the voltage at idle is 120 V, e.g. for electric drive air conditioning, or communications apparatus, the voltage at full engine RPM would be, e.g. 1200 volts. Such voltage levels are difficult and, indeed, dangerous to handle. In addition, such extreme variations in the voltage and current may require more expensive components; components rated for the high voltages and currents produced at high engine RPM (e.g. highway speeds) are considerably more expensive, than components rated for more moderate voltages.

The stator of a conventional high current motor vehicle alternator is constructed with conductors of large cross sectional area effectively connected in series. More particularly, coil groups, one associated with each phase (the A, B and C Phase) are conventionally employed. The respective Phase coil groups, (A, B and C) are connected together (terminated) as a 'WYE' or 'Delta' at one end. The opposite ends of the coil groups are arranged by phase so that each phase is isolated and then terminated to both collect and exit the alternator to a voltage control. On the exiting termination end, the coil ends of like phases are soldered in groups to insulated motor lead wire. These motor lead wires may then in turn be soldered in groups to even larger gauge motor lead wire culminating in three separate conductors for each phase, A, B and C. The lead wires are then secured to the stator by lashing the conductors to the end turns of the stator. Lashing conductors to end turns reduces the amount of exposed copper to cooling fluid passing through the alternator, in effect acting as an insulating blanket and hindering cooling of the end turns and lead wires. Several additional problems can exist with this winding method. For example: because of the low number of turns (in some instances only a single turn) per pole phase coil, it is difficult or impossible to make a small change in design output voltage by changing the number of turns of the phase pole coil; the large cross sectional area of the conductors make the stator difficult to wind; and a short circuit between coils will typically burn out the entire stator and may stall the alternator, resulting in possible damage to the drive system or overloading the vehicle engine.

In general, permanent magnet alternators incorporating a predetermined number of independent groups of windings, wound through slots about predetermined numbers of teeth where the power provided by each group is relatively unaffected by the status of the other groups are known. For example, such an alternator is described, together with a controller therefor, in U.S. Pat. No. 5,900,722 issued to Scott et al. on May 4, 1999. In the alternator described in U.S. Pat. No. 5,900,722, the number of groups of windings was equal to an integer fraction of the number of poles, and the controller circuit selectively completed current paths to the individual groups of windings to achieve a desired output.

However, there remains a need for a compact high power alternator wherein a desired output voltage can be achieved by changing the number of turns of the phase pole coil, that is relatively easy to wind, and minimizes the consequence of short circuits, while at the same time facilitating cooling.

SUMMARY OF THE INVENTION

In accordance with various aspects of the present invention, the stator winding is wound with a predetermined number of pole phase coils, preferably equal to the number of magnetic poles. Each pole phase coil is wound with enough turns to generate the required output voltage of the alternator and a fraction of the output current equal to 1 divided by the number of magnetic poles. These individual pole phase coils are then connected in parallel.

In accordance with another aspect of the present invention, a respective conducting phase ring corresponding to each output phase is installed within the alternator with each coil corresponding to the associated phase electrically connected to the conducting phase rings to facilitate cooling and grouping and transmission of output phases to the control In accordance with another aspect of the present invention the conducting phase rings are held in place by a non-conducting support structure.

In accordance with another aspect of the present invention the conducting phase rings are disposed to provide an efficient cooling by exposure to the cooling fluids e.g. air, passing over the conducting phase rings and end turns.

BRIEF DESCRIPTION OF THE DRAWING

The present invention will hereinafter be described in conjunction with the figures of the appended drawing, wherein like designations denote like elements (unless otherwise specified).

FIG. 2A is a side view of the exterior of an alternator in accordance with various aspects of the present invention.

FIG. 2G is a block schematic wiring diagram of an alternator utilizing phase rings in accordance with the present invention adapted to produce a DC voltage output.

(FIGS. 2A-2G are collectively referred to as FIG. 2).

FIG. 3B is a sectional view along C-C of the alternator of FIG. 3A.

(FIGS. 3A-3D are collectively referred to as FIG. 3).

FIG. 4D is a block schematic wiring diagram of an alternator utilizing multi-segmented conducting phase rings in accordance with the present invention adapted to produce a D.C. voltage output. (FIGS. 4A-4D are collectively referred to as FIG. 4).

DETAILED DESCRIPTION OF THE PREFERRED EMBODIMENT

Figure 1:
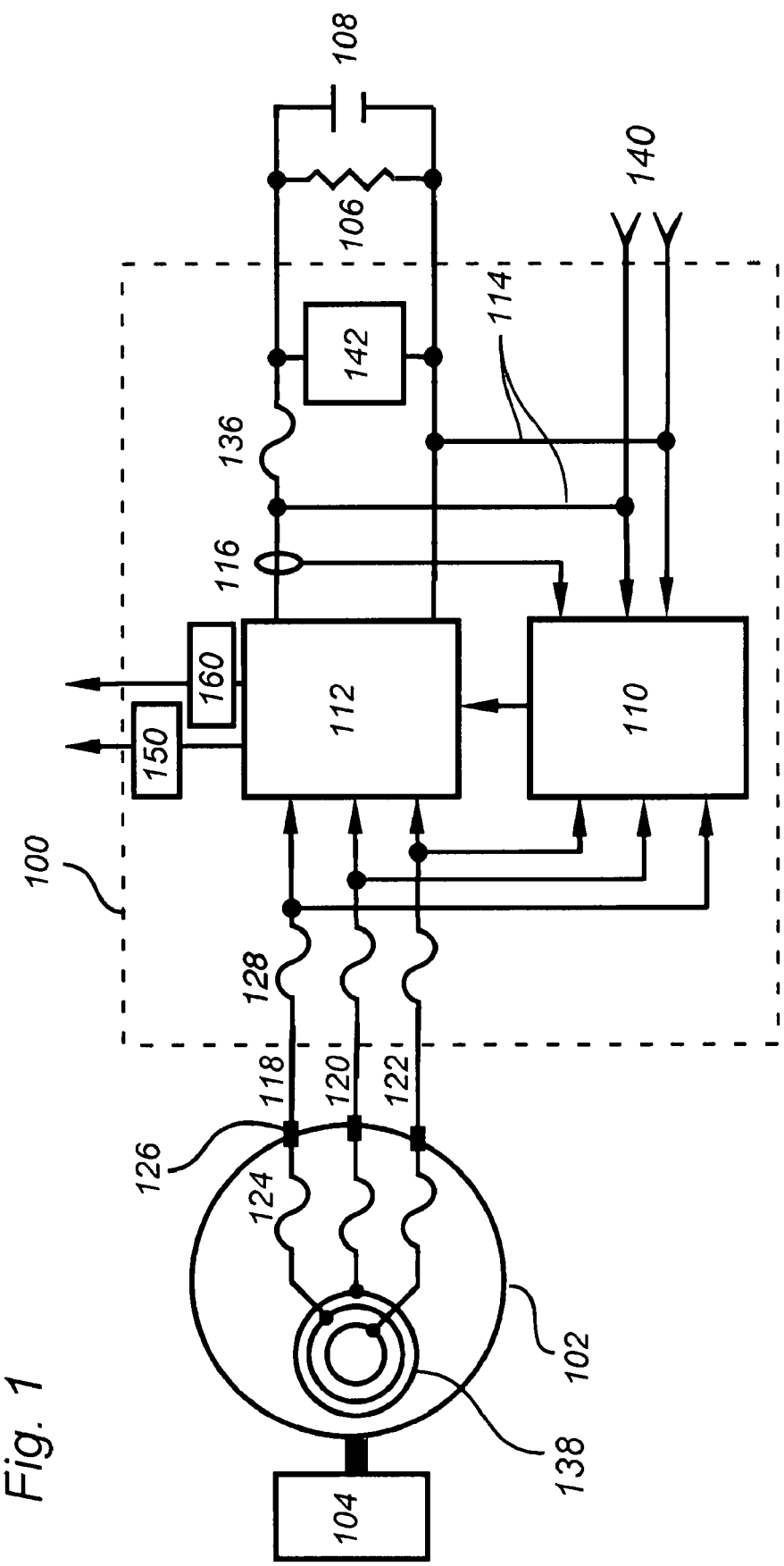
FIG. 1 is a block schematic of a system for converting between mechanical and electrical energy.

Referring now to FIG. 1, a power conversion apparatus, such as an alternator 102, in accordance with various aspects of the present invention, suitably cooperates with a rectifying control system 100 and a source of mechanical energy (e.g. drive) 104, e.g. an engine or turbine, a load 106, such as a motor and, if desired, in energy storage device 108, such as a battery, capacitor, or flywheel.

Rectifying control system may be any system suitable for rectifying the AC signal from alternator 102, i.e. converting it into a DC signal, and regulating the voltage of that signal at a predetermined level, e.g. 28V. In the preferred embodiment, system 100 comprises a controller 110 and a switching bridge 112 such as described in commonly owned US patent application Ser. No. 11/347,777 by Faber man et al (including the present inventors), entitled "Controller for AC Generator" and filed Feb. 2, 2006. If desired, an inverter (sometimes categorized as comprising part of load 106) can also be provided to generate an AC signal at a constant predetermined frequency and amplitude (e.g. 60 Hz, 120V).

In general, alternator 102 generates AC power in response to mechanical input from energy source 104. Alternator 102 preferably provides multi-phase (e.g. three-phase, six-phase, etc.) AC output signals, e.g. phase A (118), phase B (120), and phase C (122). Those output signals are typically unregulated and may vary significantly in accordance with drive RPM (source 104).

The AC phase signals from alternator 102 are applied to system 100, preferably through input fuses 128. System 100 rectifies the AC signal from alternator 102, i.e. converts it into a DC signal and regulates the voltage of that signal at a predetermined level, e.g. 28V. In the preferred embodiment, switching bridge 112 selectively, in response to control signals from controller 110, provides conduction paths between the various phases of the AC signal from alternator 102 and a load 106. Exemplary switching bridges 112 are shown in commonly owned co-pending U.S. patent application Ser. No. 11/347,777 by Faber man et al (including the present inventors), filed Feb. 2, 2006. Controller 110 selectively generates control signals to switching bridge 112 to produce a regulated output signal at a predetermined voltage. Controller 110 suitably samples the regulated output either locally at input 114, or remotely at input 140 and adjusts the signals to bridge 112 to maintain the proper output. Additionally, the output current is sensed at input 116 to further modify the control signals to bridge 112.

The regulated DC signal Voltage Regulated Output (VRO) is then applied, suitably through an output fuse 136, to load 106 and energy storage device 108. Load 106 may be any device that uses power, such as, e.g. lights, motors, heaters, electrical equipment, power converters, e.g. inverters or DC-to-DC converters. Energy storage device 108 filters or smoothes the output of control system 110 (although, in various embodiments, controller 110 may itself incorporate or otherwise provide adequate filtering).

If desired, other outputs, 150, and 160, may be provided by system 100. In addition, a suitable crowbar circuit 142 may be provided for system protection.

Alternator 102 is preferably an alternator generally of the type described in commonly owned co-pending U.S. patent application Ser. No. 10/889,980 by Charles Y. Lafontaine and Harold C. Scott, entitled "Compact High Power Alternator" and filed on Jul. 12, 2004, but includes for each pole, a respective group of windings (including at least one winding corresponding to each phase) with all of the windings corresponding to a given phase connected in parallel. The aforementioned Lafontaine et al application is hereby incorporated by reference as if set forth verbatim herein.

In accordance with one aspect of the present invention, a parallel connection between coils corresponding to the same phase is effected through a corresponding conducting phase ring 138, and includes fusible links 124, disposed between the conducting phase rings 138, and the output terminals 262 of the alternator. The output of each individual coil is collected by its respective conducting phase ring 138, which is in turn attached to its respective output terminal 126.

As the total number of poles in alternator 102 increases, so too do the number of individual coils. The conventional method of gathering coils involves soldering the motor wire to conventionally insulated motor lead wire. As the rated output of the alternator increases, a corresponding increase in the load carrying capacity of the motor lead wire is also required. Increasing load demand on the lead motor wire is typically met by increasing the cumulative gauge of the wire, either by increasing the gauge of a single wire or by using multiple wires in parallel. The net effect is increasingly large cross sectional areas of motor lead wire. When considering the total number of coils and their respective end turns along with the lead wire and its associated insulation, the resulting stator assembly with conductor and motor lead wire tied together insulate the end turns, detrimental to cooling. The resulting assembly also restricts the only available coolant flow (e.g., airflow) over the end turns further reducing cooling.

Thus, there is a need for a compact high power alternator wherein a desired output voltage can be achieved by changing the number of turns of the phase pole coil, that is relatively easy to wind, and minimizes the consequence of short circuits, while at the same time facilitating cooling. In accordance with various aspects of the present invention this is achieved by employing a predetermined number of pole phase coils, preferably equal to the number of magnetic poles, with pole phase coil wound with enough turns (of a relatively small diameter wire) to generate the required output voltage of the alternator and a fraction of the output current equal to 1 divided by the number of magnetic poles and connecting the individual pole phase coils in parallel, preferably employing conducting phase rings (collectors) 138. Use of conducting phase rings 138 not only greatly simplifies assembly of alternator 102, but also facilitates cooling of the windings.

More particularly, alternator 102 preferably comprises: a shaft 202, preferably including a tapered projecting portion 204 and a threaded portion 206; a rotor 208; a stator 210; a front endplate 212; a front bearing 214; a jam nut 216; a rear endplate 218; a rear shaft retaining ring 220; a rear bearing 222; a rear jam nut 224; an outer casing 226 and respective tie rods (not shown). Rotor 208 is mounted on shaft 202 for rotation with the shaft. Stator 210 is closely received within rotor 208, separated from rotor 208 by a small air gap 228. Front endplate 212, front bearing 214, rear bearing 222, rear endplate 218, outer casing 226 and tie rods cooperate as a support assembly to maintain alignment of shaft 202, rotor 208, and stator 210. Shaft 202 is maintained by bearings 214 and 222, which are mounted on front endplate 212 and rear endplate 218, respectively, and rotatably maintain and align shaft 202 concentric and perpendicular with the endplates. Rotor 208 is mounted for rotation on shaft 202, positively positioned by cooperation with tapered shaft portion 204. Rear endplate 218 mounts and locates stator 210 so that it is disposed within rotor 208 properly aligned with shaft 202 and rotor 112. Outer casing 226 has end faces perpendicular to its axis (is preferably cylindrical) and is disposed between front endplate 212 and rear endplate 218. Tie rods compress endplates 218 and 212 against outer casing 226, keeping the components squared and in alignment.

In a typical automotive alternator application, a pulley 230 is mounted on the end of shaft 202. Power from an engine (e.g., 104, not shown in FIG. 2) is transmitted through an appropriate belt drive (not shown) to pulley 230, and hence shaft 202. Shaft 202 in turn causes rotor 208 to rotate about stator 210. Rotor 208 generates a magnetic field, which interacts with the windings on stator 210. As the magnetic field intercepts the windings, an electrical current is generated, which is provided to a suitable load.

Rotor 208 preferably comprises an endcap 232, a cylindrical casing 234 and a predetermined number (e.g. 16 pairs) of alternatively poled permanent magnets 236 disposed in the interior side wall of casing 234. Rotor endcap 232 is suitably substantially open, including a peripheral portion 238, respective cross-arms (not shown) and a central hub 240 to provide for connection to shaft 202. Respective coolant (e.g., air) passageways 242 are provided through endcap 234, bounded by peripheral portion 238 adjacent cross arms (not shown), and central hub 240.

Stator 210 suitably comprises a core 244 and conductive windings (shown schematically) 280. Core 244 suitably comprises laminated stack of thin sheets of soft magnetic material, e.g. non-oriented, low loss (lead free) steel, that are cut or punched to the desired shape, aligned and joined. Core 244 is generally cylindrical, with an axially crenellated outer peripheral surface, i.e., includes a predetermined number of teeth and slots. Core 244 is preferably substantially open, with a central aperture, and suitably includes crossarms with axial through-bores to facilitate mounting to rear endplate 218.

Front endplate 212 is suitably generally cylindrical, including: a centrally disposed hub 246, including a coaxial aperture that locates front bearing 214; a peripheral portion and including respective tapped holes (not shown) disposed at predetermined radial distances from the central aperture, distributed at equal angular distances, to receive tie rods (not shown); and respective (e.g., 4) crossarms (not shown) connecting peripheral portion 248 to hub 246, and defining respective coolant (e.g., air) passages 250

Rear endplate 218 carries and locates rear bearing 222, and mounts and locates stator core 244. Rear endplate 218 suitably includes a stepped central hub 252 having a forward reduced diameter portion 254 and central aperture 256 there through, and is generally cylindrical preferably having the same outer diameter as front endplate 212, connected to hub 252 by respective crossarms (not shown). Rear endplate 218 also suitably includes respective coolant (e.g., air) passageways 258, bounded by adjacent crossarms (not shown), outer portion 260, and hub 252.

The output from stator windings 280 is collected by phase rings 138 and provided at respective output terminals 262. More particularly, output terminals 262 (one for each phase) are suitably provided in rear endplate 218. Terminals 262 are suitably electrically connected through fusible links 124, to associated conducting phase rings (collectors) 138. Output terminals 262 and fusible links 124 are positioned radially about conducting phase rings 138. The respective phase rings 138 collect, e.g. are electrically connected to, through, e.g., conductors 276, each of the individual coils with the associated phase. Respective individual conducting cables (e.g. 294 in FIG. 2G) are attached to terminals 262 to transmit phase output to the control 100.

Conducting phase rings 138 are made of a suitable conductive material e.g. plated copper. Phase rings 138 are suitably uninsulated or minimally insulated (e.g. with varnish) to facilitate cooling and sufficiently stiff or rigid to facilitate isolation from each other once mounted and subjected to environmental forces/acceleration. The conducting phase rings may be formed of rod stock or punched from a sheet of appropriate material. In the embodiment of FIG. 2, conducting phase rings 138 are each continuous e.g. a single piece rod stock with it ends connected by e.g., soldering or brazing, to form a continuous conducting ring.

Use of solid continuous phase rings 138 are particularly advantageous in that dual current paths to fusible link 124 permits use of lower gauge (and thus lighter and less expensive) material for phase rings 138. When a solid, a continuous phase ring 138 is utilized, the current is effectively split at a point 180 degrees opposite the point at which fusible link 124 is attached. All current produced by conductors 276 on one half of the phase ring exit to fusible link 124 effectively remains on that half, current produced on the opposite half follows that path to fusible link 124. The result is a phase ring approximately half the gauge of a conductor with only a single path to fusible link 124.

The respective rings 138 are disposed in the coolant flow path, electrically isolated and spaced apart from each other and from rear endplate 218. Conducting phase rings 138 are suitably mechanically fastened to endplate 218 using a non-conducting conducting phase ring mounting structure 264 preferably made of a high impact resistant and chemically stable material e.g. polyamide-imide, so that each conducting phase ring, one for each phase output, are physically spaced apart and isolated electrically from each other and rear endplate 218. Conducting phase rings 138 are positioned in coolant (e.g., air) passage 258 to maximize exposure to coolant (e.g., air) flow produced by alternator 102. The exposure to airflow is further maximized by progressively varying the diameter of adjacent phase rings. For example, the phase ring 138 associated with phase A (terminal 118) is disposed closest to the interior of endplate 218, but of a relatively large diameter (suitably approaching the outer diameter of coolant (e.g., air) passage 258 in endplate 218). The phase ring 138 associated with phase B (terminal 120) is suitably coaxially disposed but offset rearwardly, and with a smaller diameter (the outer diameter of the phase B ring suitably less than the inner diameter of the phaseA ring by a predetermined amount). The phase ring 138 associated with phase C (terminal 122) is likewise suitably coaxially disposed but offset rearwardly from the phase B ring 138, and with a smaller diameter (the outer diameter of the phase C ring suitably less than the inner diameter of the phase B ring by a predetermined amount). This alignment, made possible by phase ring mounting structure 264, presents each ring to cooling air flow at close to ambient inlet temperature as possible. Preferably, the rings farthest from the ambient inlet have the larger diameters.

Figure 2B:
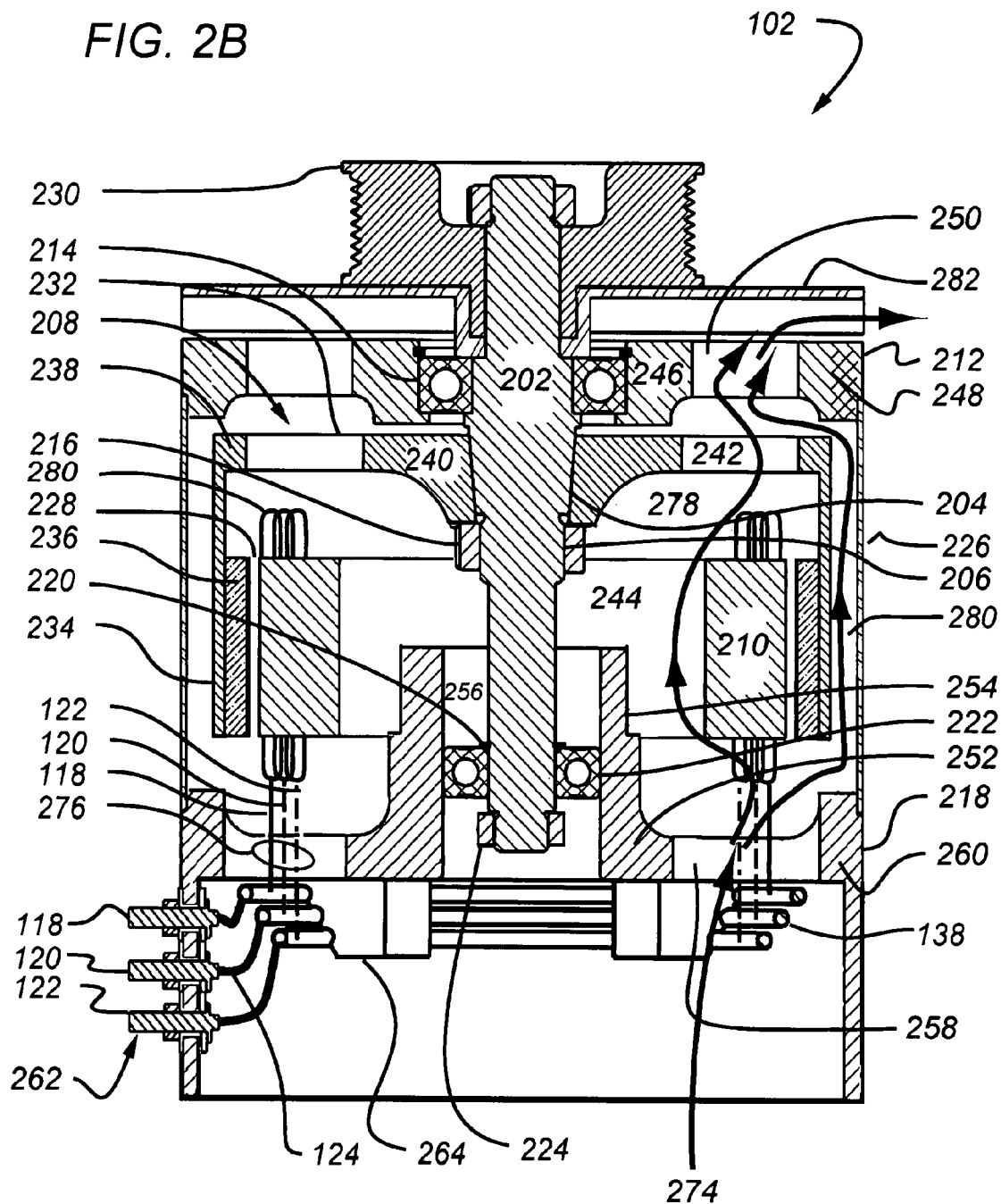
FIG. 2B is a sectional view along A-A of the alternator of FIG. 2A.
Figure 2C:
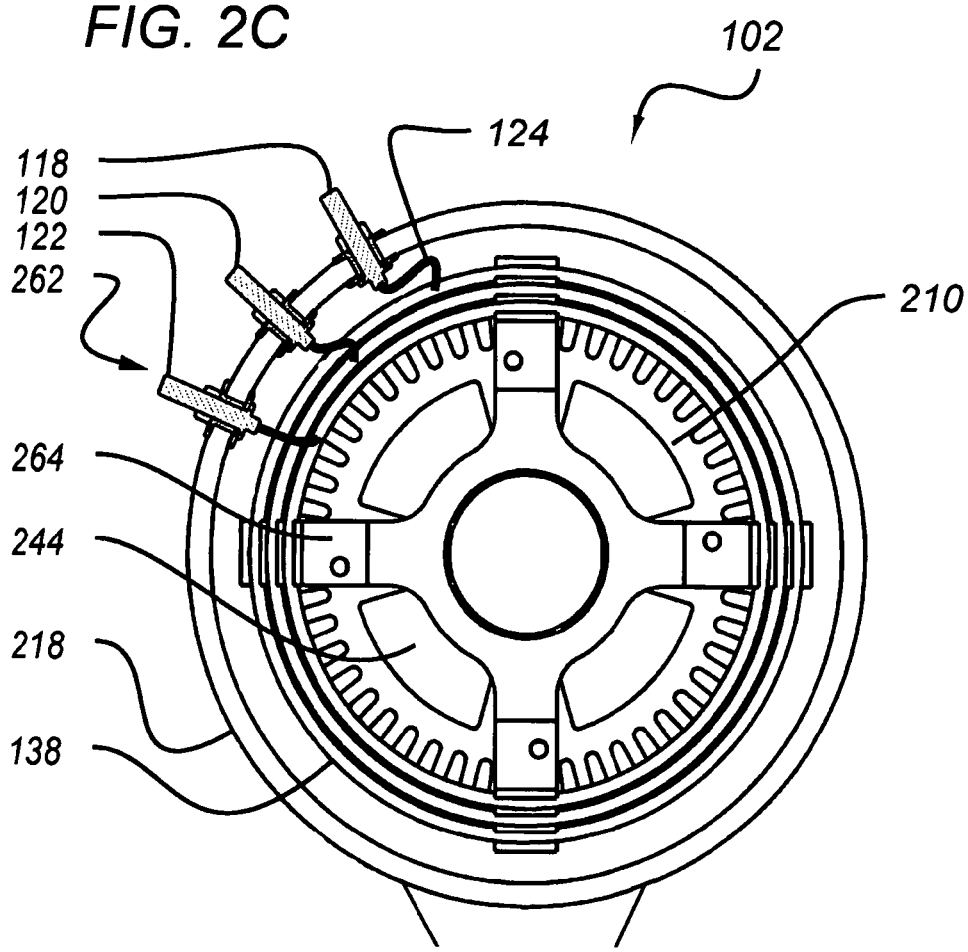
FIG. 2C is a simplified sectional view along B-B of the alternator of FIG. 2A showing the relative placement of the conducting phase rings within the alternator.
Figure 2D:
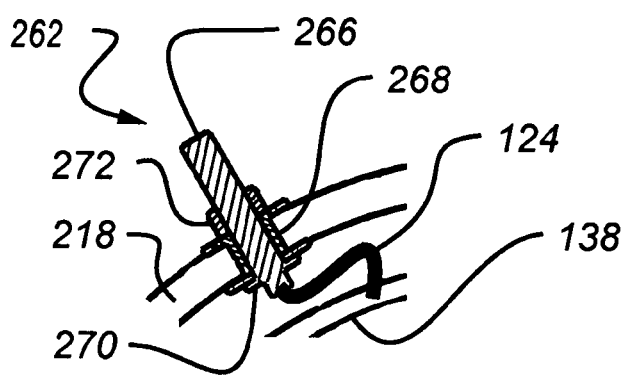
FIG. 2D is simplified sectional view of a terminal in the alternator of FIG. 2A.

Referring to FIG. 2D, output terminal assembly 126 suitably comprises a threaded conducting stud 266, preferably a highly conductive corrosion resistant material (e.g. plated copper) along with an electrically non-conductive bushing 268, preferably a high impact resistant and chemically stable material (e.g. polyamide-imide), to electrically isolate the output terminal from alternator rear endplate 218. The threaded conducting stud 266 in the preferred embodiment has an incorporated shoulder 270, to act as a seat from inside alternator rear endplate 218 to which nut 272 can be tightened, capturing the assembly in rear endplate 218.

Fusible link 124 is made of a suitable material e.g. a calculated diameter and length of wire (preferably plated copper) that will melt when subjected to loads calculated to be destructive to alternator 102, control 100 or electrical systems being powered by said equipment. In the preferred embodiment fusible link 124 is soldered or brazed to both the threaded conducting stud 266 and conducting phase ring 138. An alternate method to secure the fusible link is to attach a suitable lug to the end of fusible link 124 which is then fastened to stud 266 mechanically by means of a threaded nut.

Referring particularly to FIGS. 2B and 2C, conducting phase rings 138 are fastened to structure 264. Conducting phase rings 138 are disposed in the coolant path, exposed to coolant flow (e.g., airflow) 274, cooling conducting phase rings 138 as well as conductors 276 (connecting the coil windings to phase rings 138). Ring mounting structure 264 is positioned to produce a gap between phase rings 138 and the stator end turns (not shown). This gap exposes the rear stator end turns to cooling fluid that would not be available in a conventionally wound stator.

Coolant (e.g. cooling air) continues through the alternator and impinges upon winding end turns 280 of stator 210 cooling the end turns. Airflow then divides and proceeds through stator core 244 and into cavity 278 at which point it cools the far end turns of stator 210. The other divided airflow passes between rotor casing 234 and outer casing 226 cooling rotor casing 234 and magnets 236. The divided airflow rejoins in air passageway 250 and leaves the alternator to centrifugal fan 282.

Conductors 276, comprising an A phase 118, B phase 120 and C phase 122 component of a single three-phase pole group, as will be described later, exit stator 210 and are soldered or brazed to their respective associated conducting phase rings 138. Conductors 276 in the preferred embodiment are exposed to airflow 274. In certain cases it may be desirable to sheath conductors 276 with a thin walled electrically isolating material e.g. Nomex to protect against grounding.

Figure 2E:
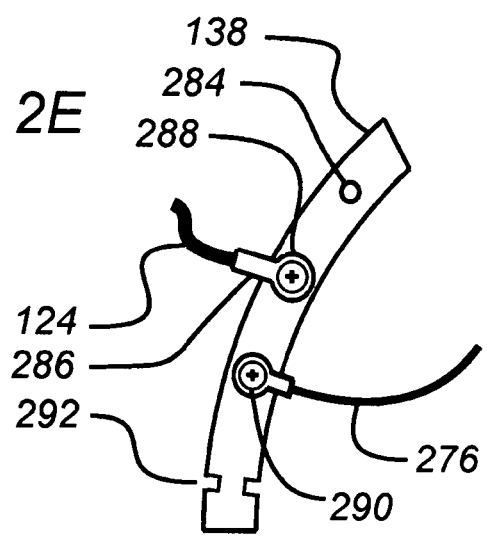
FIG. 2E is a diagram showing an alternative embodiment of a conducting phase ring.

Referring now to FIG. 2E an alternate method of producing conducting phase ring 138 is accomplished by forming it of rectangular stock such that suitable surfaces are presented for drilling and tapping holes 284. The end of fusible link 124 can, in this embodiment, be attached with a suitable lug 286 for fastening by, e.g. a threaded fastener 288 to conducting phase ring 138. Equally, conductor 276 can also be equipped with a similar lug and fastened to conducting phase ring 138 using fastener 290. Conducting phase ring 138 is in turn secured in a similar manner to rear endplate 218 using an appropriate structure similar to 264. Alternatively slots 292 may be cut into each phase ring at regular intervals in which individual conductors exiting the stator can be soldered. This method of assembly has a major advantage over previously described methods of fastening conductors 276 to phase rings 138 in that automation of assembly can be implemented by modifying existing ultrasonic soldering equipment used to terminated conductors in electric motor manufacturing.

Figure 2F:
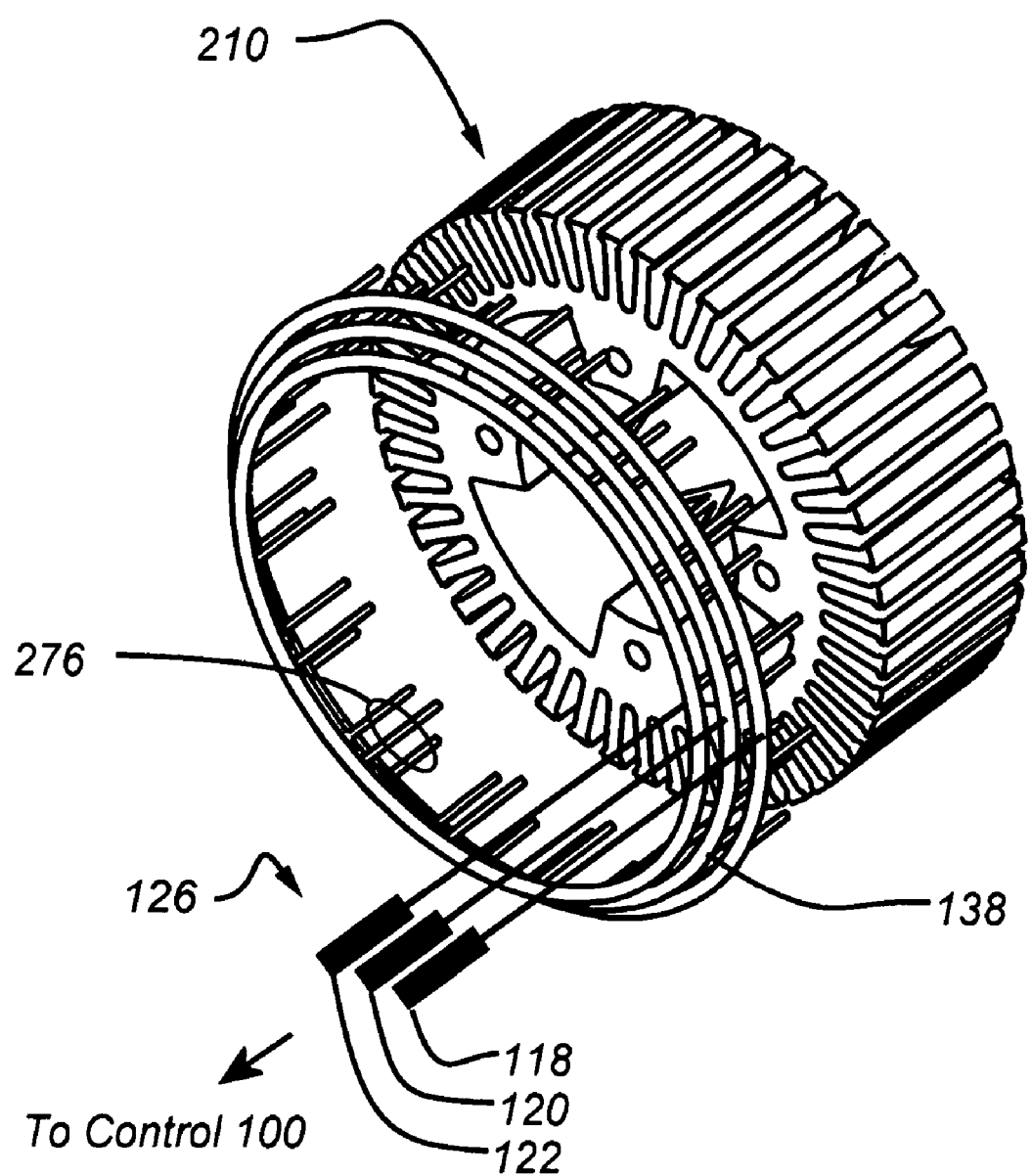
FIG. 2F is a simplified perspective view of the stator core, and the conducting phase rings of the alternator of FIG. 2A, illustrating the connections between the conducting phase rings and respective groups of windings (winding end turns omitted).

Referring now to FIG. 2F, stator 210 is shown, for clarity, without coils, and with individual conductors 276 in greatly reduced detail. In this particular embodiment, the respective phase rings 138 associated with each of the three A, B and C phases are continuous either by soldering, brazing or machined from a single piece of un-insulated, corrosion resistant conductive material e.g. plated copper. Terminals 126, represented graphically, correspond to A phase 118, B phase 120 and C phase 122. The output of each pole group is collected within the alternator through the phase rings 138 and exits the alternator via three conductors that representing all three phases to control 100.

Referring now to FIG. 2G individual conductors 276 from the respective A phase, B phase and C phase windings 118, 120, and 122 are terminated on respective collection phase rings 138 which then in turn are carried to control 100 via conductors 294. The output from control 100 results in a voltage regulated output or VRO, of an application specific voltage e.g. 28 VDC.

Conductors 294, coupled between output terminals 264 and control 100 are suitably of sufficient gauge to adequately carry the current. As the gauge of a wire or cable increases, it becomes increasingly difficult to route cables due to the larger bend radius found in large gauge wire. As a result it is difficult to use very large gauge wire or cable in many applications. As will be discussed, in applications in which very large conductors may not be appropriate it is possible then to segment phase rings into multiple sections in which each phase ring section is assigned an appropriately sized conductor to carry the reduced current produced by that specific section.

For example, current requirements may be reduced by employing phase rings split into a plurality of groups. Referring now to FIG. 3A-3D, an alternator 302 employing two sets of phase rings 306 with corresponding terminals 126 and fusible links 124, cooperate with associated controls 308 and 310. Phase rings 310 are separated electrically at point 312 and 314. Each group carries respective A phase, B phase and C phase components each leading to their respective controls 308 and 310. Rear end plate 304 is similar in all respects to end plate 218 in all but one feature in that it is machined to accept a second set of terminals 126.

Figure 3A:
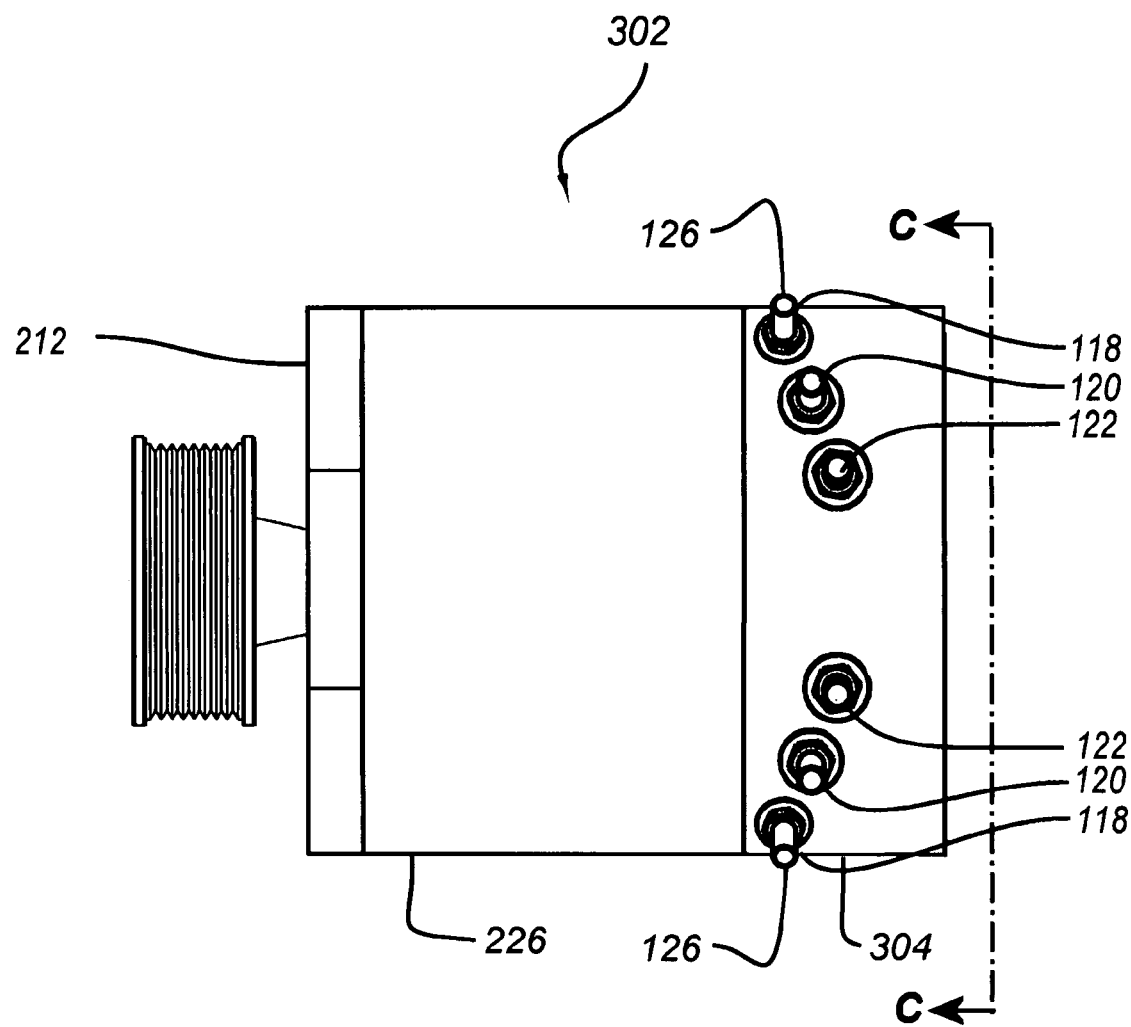
FIG. 3A is a side view of the exterior of an alternative embodiment alternator in accordance with various aspects of the present invention.
Figure 3C:
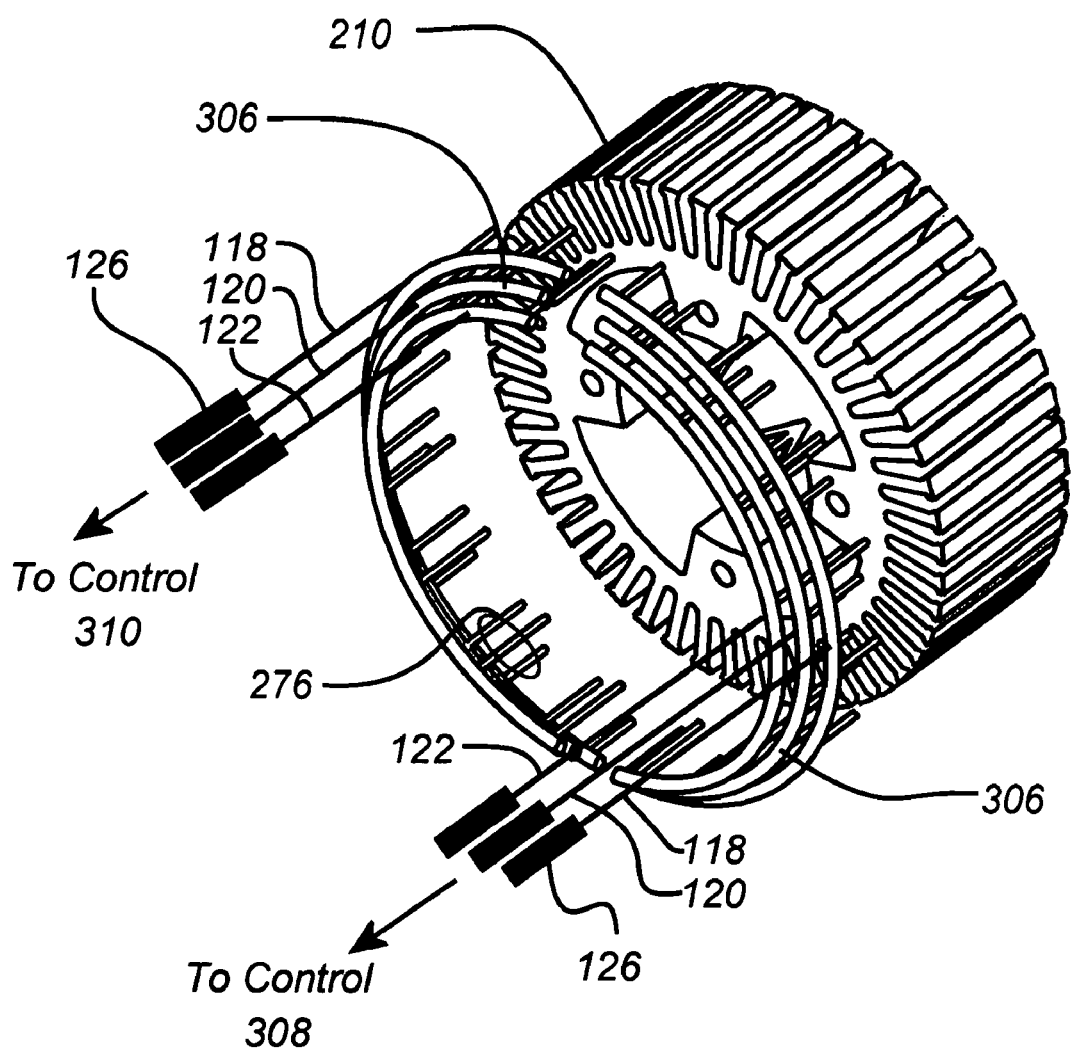
FIG. 3C is a simplified perspective view of the stator core, and the segmented conducting phase rings of the alternator of FIG. 3A, illustrating the connections between the segmented conducting phase rings and respective groups of windings (winding end turns omitted).
Figure 3D:
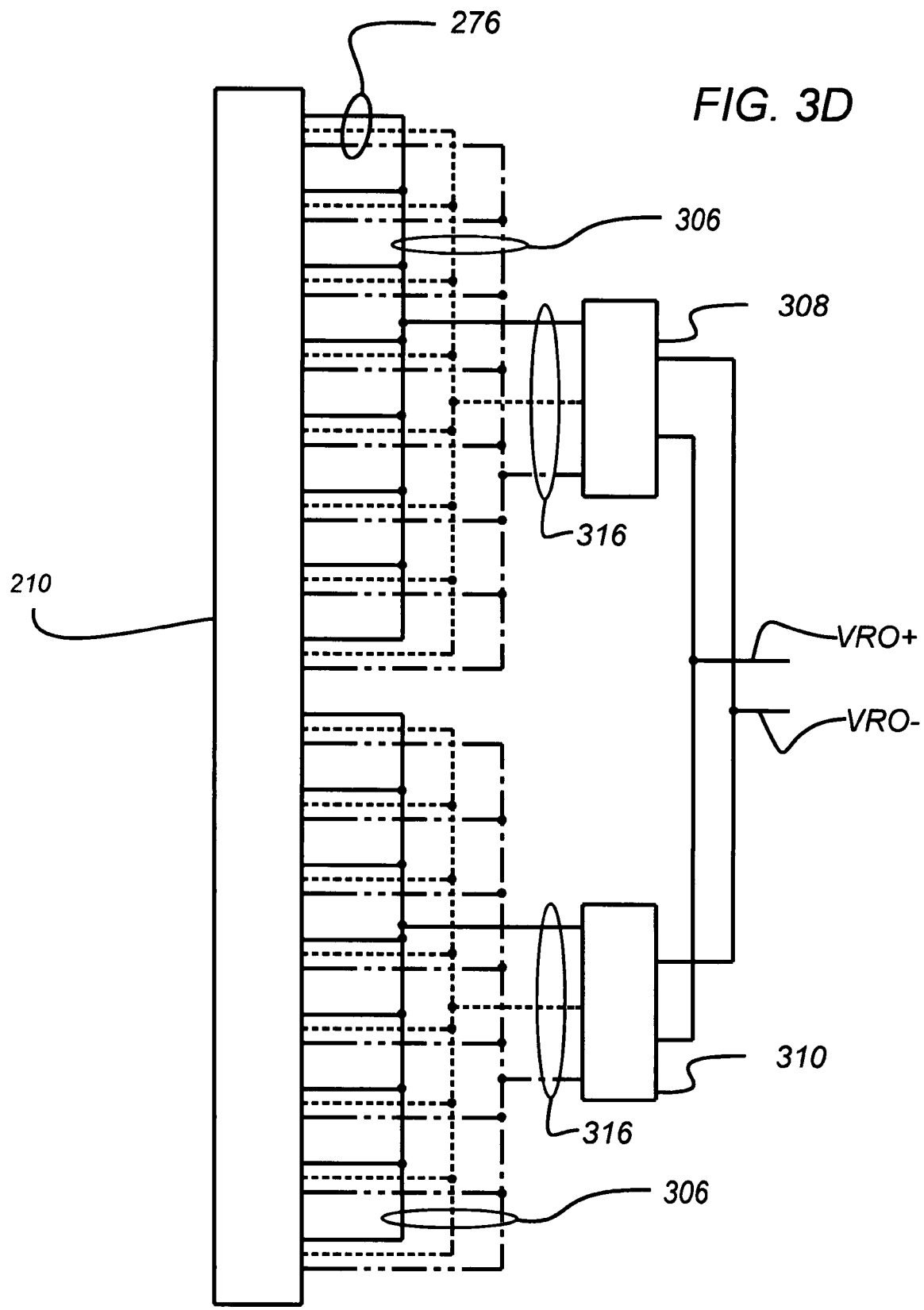
FIG. 3D is a block schematic wiring diagram of an alternator utilizing segmented conducting phase rings in accordance with the present invention adapted to produce a D.C. voltage output.
Figure 4A:
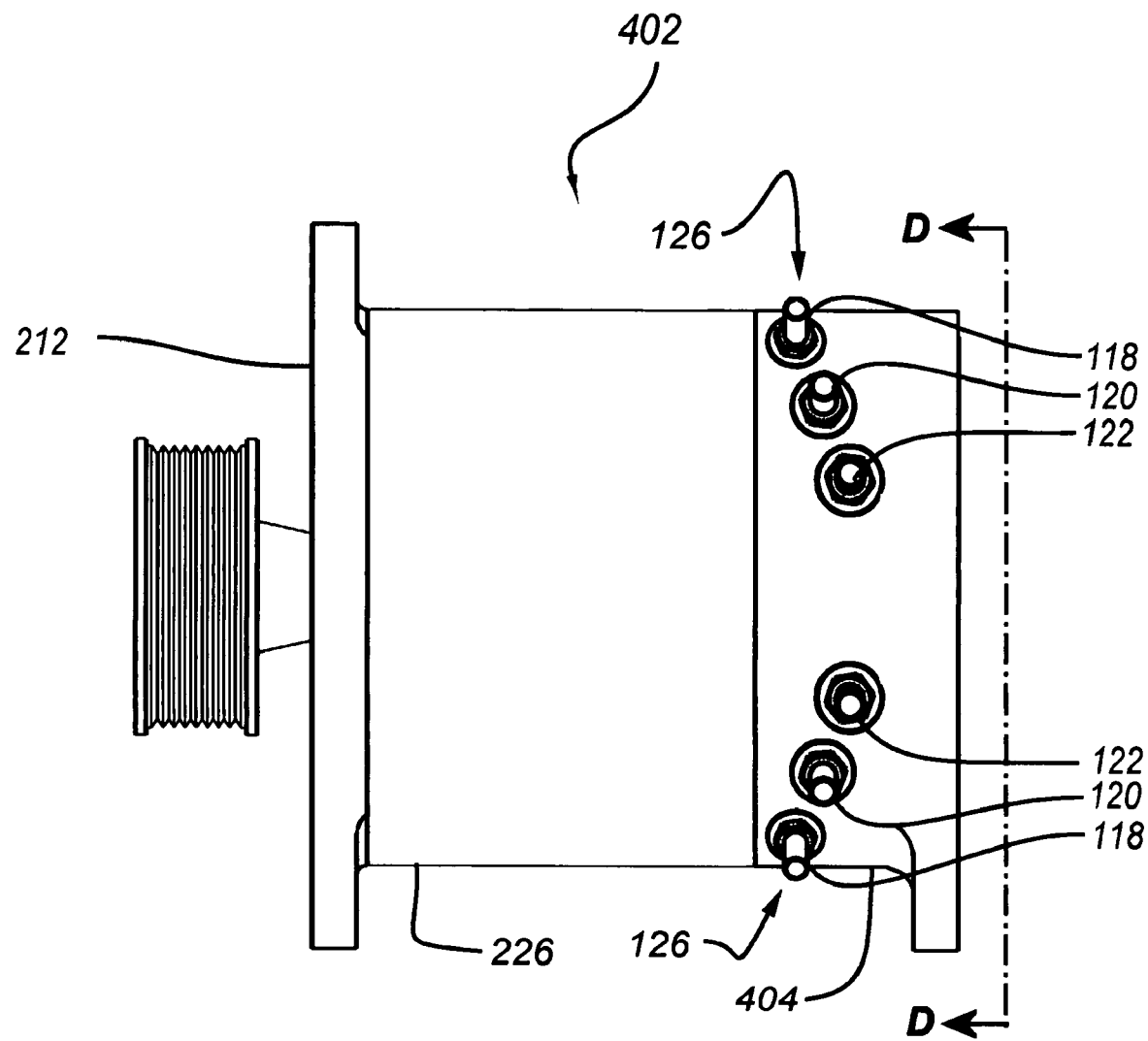
FIG. 4A is a top view of the exterior of an alternative embodiment alternator in accordance with various aspects of the present invention.
Figure 4B:
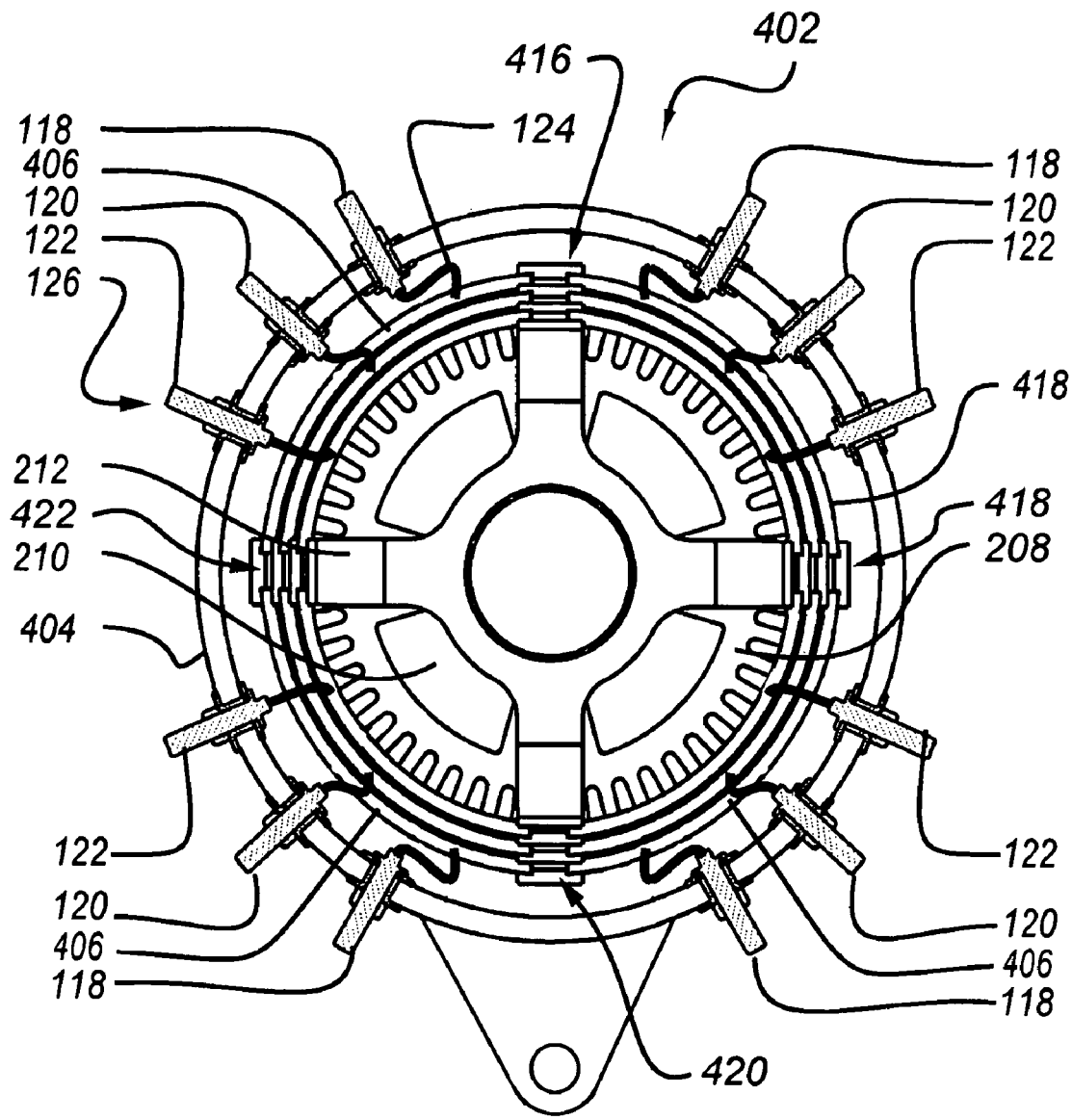
FIG. 4B is a sectional view along D-D of the alternator of FIG. 4A.
Figure 4C:
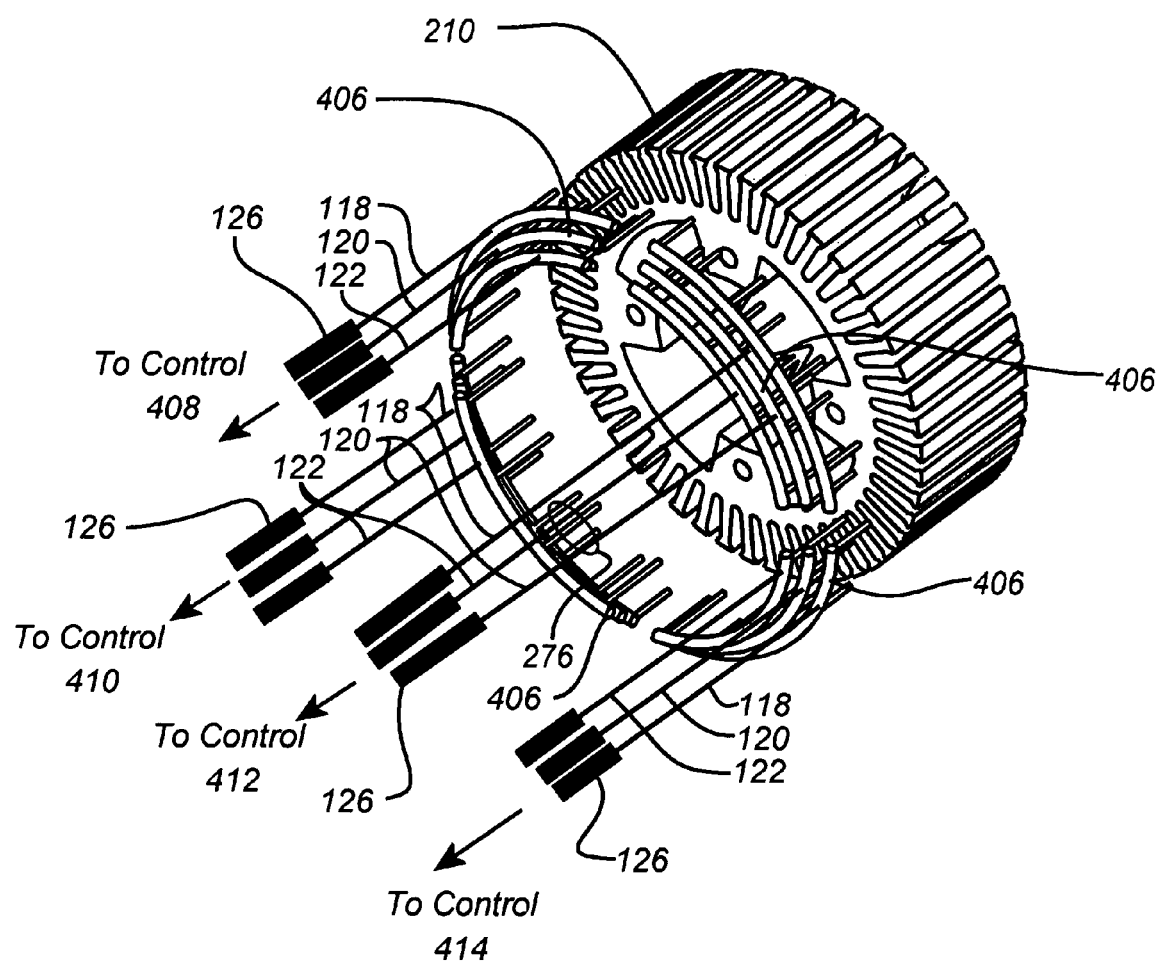
FIG. 4C is a simplified perspective view of the stator core, and the multi-segmented conducting phase rings of the alternator of FIG. 3A, illustrating the connections between multi-segmented conducting phase rings and respective groups of windings (winding end turns omitted).

Referring now to FIG. 3D, phase ring portions 306 each receive their respective conductors 276 from stator 210. Phase ring portions 306 are electrically connected via terminals 126, conductors 316 to controls 308 and 310. When terminal 126 is connected in the middle of phase ring portion 306, the current is effectively split at the point at which fusible link 124 is attached. All current produced by conductors 276 on one half of the phase ring portion exit to fusible link 124 effectively remains on that half, current produced on the opposite half follows that path to fusible link 124. The result is a phase ring portion approximately half the gauge of a conductor with only a single path to fusible link. The gauge of conductors 316 can be sized according to application specific requirements. Modern engine compartments have very little space to offer when considering, for example, the size of conductor required to properly conduct 600 amps of power at 28 VDC. By halving the current carried by conductors 316 in very high output applications, routing of cables becomes much more manageable. There is a corresponding benefit in the controls as well. As amperage increases the size and cost of components increases, but not in a linear fashion. Therefore by halving the current carried by the conductors and the control components as well, a savings in space and cost is achieved.

Current requirements can be further reduced by splitting the phase rings into a plurality of portions. For example, referring to FIGS. 4A-4D, the phase rings can be broken into four sections 406, electrically separated at points 416, 418, 420, and 422. An associated set of terminals 118, 120, 122 is provided for each phase ring segment, connected to respective controls 408, 410, 412, and 414. As with phase ring portions 306, terminal 126 is connected in the middle of phase ring portion 406, the current is effectively split at the point at which fusible link 124 is attached. All current produced by conductors 276 on one half of the phase ring portion exit to fusible link 124 effectively remains on that half, current produced on the opposite half follows that path to fusible link 124. The result is a phase ring portion approximately half the gauge of a conductor with only a single path to fusible link. The outputs of controls 408, 410, 412, and 414 are connected in parallel to provide outputs VRO+ and VRO−.

Figure 5:
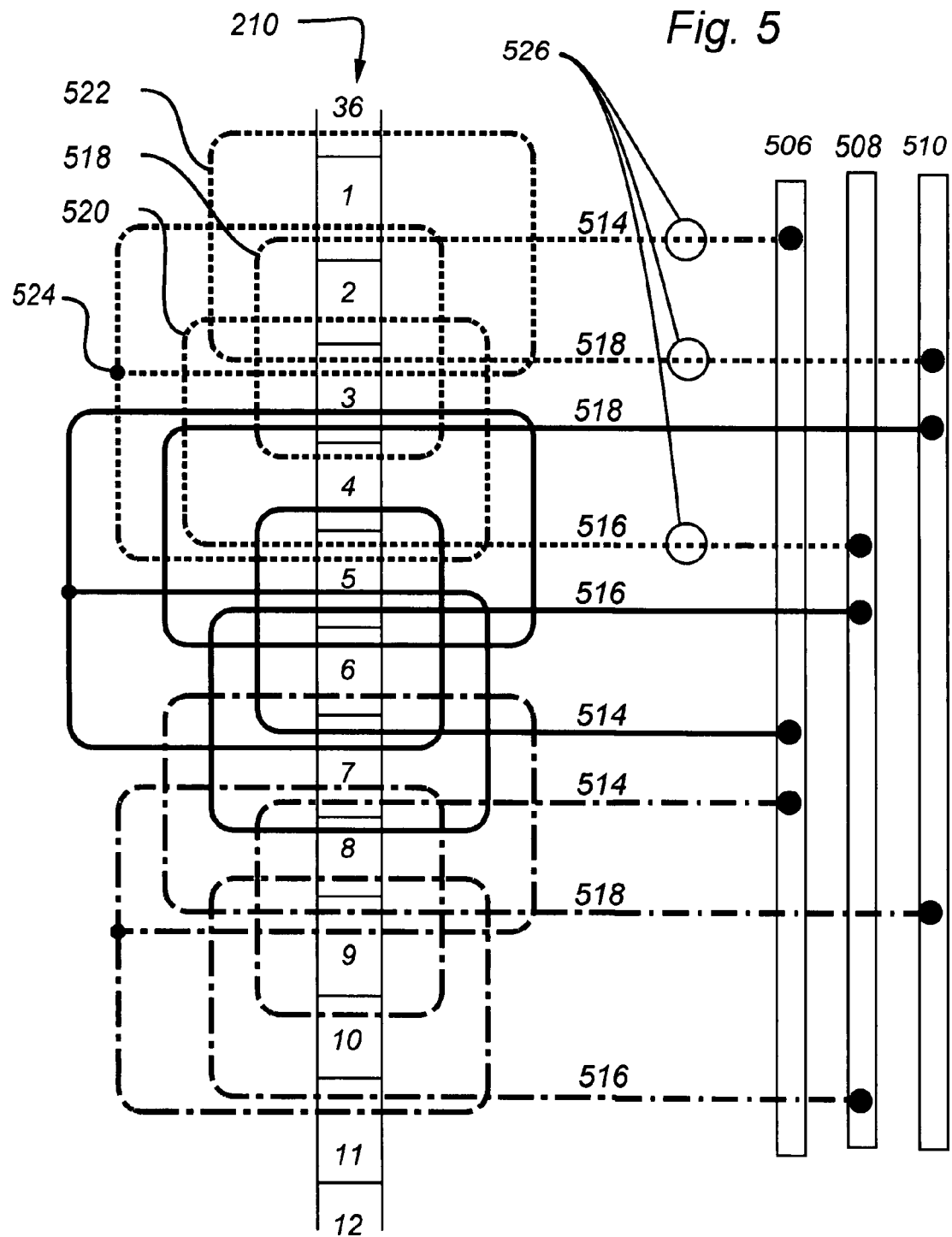
FIG. 5 is a schematic wiring diagram illustrating three individual windings of a three phase pole group of the stator used in each of the embodiments of this invention.

As previously noted, stator core 210 is generally cylindrical with an axially crenellated outer peripheral surface having a predetermined number of equally spaced teeth and slots. The conductive windings (formed of a suitably insulated electrical conductor, such as varnished copper motor wire), are wound through a respective slot, outwardly along the side face of the core around a predetermined number of teeth, then back through another slot. Referring now to FIG. 5, stator core 210 includes a predetermined number of slots, e.g. 36 (shown schematically in FIG. 5, indicated by numerals 1-36). The conductive windings include a predetermined number of individual phase coils (A phase, B phase, and C phase) corresponding to each magnetic pole in the rotor. Individual pole phase coils of a three phase alternator comprise an A pole phase coil 518, B pole phase coil 520 and C pole phase coil 522 which collectively make up a pole phase coil group 526. There is one pole phase coil group for each pole of an alternator (e.g. 12 pole phase coil groups in a 12-pole alternator) cooperating in a "Wye" connection 524. The pole phase coil conductors 526 of a 12 pole alternator are attached to their respective conducting phase ring 506, 508 and 510.

For example, an individual pole phase coil 522 (C phase of pole group 1) is wound around slots #36 and #3 of stator 210. The number of turns of conductor 526 comprising coil 522 is equal to the number of turns required to generate the rated output voltage of one phase of the alternator. The output current portion of the individual phase coil is equal to 1 divided by the number of magnetic poles of the alternator. Thus, the individual pole phase coil is made up of a relatively large number of turns of relatively small wire.

This construction results in a number of advantages, both during construction of the alternator and during operation of the alternator.

Because each individual pole phase coil is made up of a relatively large number of turns, small changes in design voltage can be accomplished by changing the number of turns. For example, a particular 12 pole alternator wound in a conventional manner with all of the pole phase coils connected in series may require 1.0417 turns of conductor equal to wire gage 6.285 to produce 14 VDC (after proper rectification), 300 amperes at 1940 rpm. Neither the number of turns nor the equivalent wire gage is practical numbers for production. By constructing the example alternator with the pole phase coils connected in parallel, each individual pole phase coil would be 12.5 turns of 17 gage wire. (As a note, half turns can be constructed by terminating one end of the individual pole phase coil, say the start, on one side of the stator lamination stack, and the other end, say the finish, at the other side of the stator lamination stack. This construction is illustrated in FIG. 18A) Further to this example, increasing the original design to 1.0833 turns (again, an impractical number) would reduce the rpm to 1894. This could be accomplished in the alternate construction by increasing each parallel pole phase coil to 13 turns. The relatively small cross sectional area of the conductors provides for easier winding of the coils.

A short circuit between turns of an individual pole phase coil results in most of the power being generated in the alternator flowing in the shorted coils. Because the coils are constructed of a relatively large number of turns of relatively small cross sectional area conductors, the shorted turns will very quickly melt and clear the short circuit. The decrease in output power resulting from one pole phase coil opening up is approximately 1/(number of magnetic poles+number of phases). For example the power output reduction of a 12 pole, three-phase alternator with one pole phase coil shorted and then self cleared is approximately 3%.

For example, a short circuit between turns of an individual pole phase coil will typically clear in less than two seconds. Damage to the alternator drive system is eliminated, the engine continues operation with no additional load and the alternator continues to produce power to the connected load. Conducting phase rings 138 are individually identified as A ring 506, B ring 508 and the C ring 510. Three individual pole phase coil conductors, A phase 512, B phase 514 and C phase 516 are schematically illustrated for clarity. Each of the three pole phase coils that make up a pole phase coil group is, in this illustration connected in a "Wye" connection 524. As noted earlier, the use of a "Delta" connection can also be implemented using phase collector rings.

The individual phase coil conductors are gathered in an efficient manner that does not impede cooling. With phase coil conductors leaving the phase coil end turn at 90 degrees to the face of stator 210, the end turns are exposed to the greatest air flow possible which in turn offers the best possible cooling of said end turns.

Although the present invention has been described in conjunction with various exemplary embodiments, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

What is claimed is:

1. Compact, high power, power conversion apparatus comprising:
   a rotor comprising a cylindrical casing, and a predetermined number of permanent magnets disposed on the casing, the rotor being adapted for rotation about the axis of the casing,
   a stator comprising a core and a plurality of sets of conductive windings, each set including a predetermined number of individual conductive windings and associated with an electrical phase;
   a respective collecting conductor associated with each set of conductive windings, each individual conductive winding of the set being electrically connected in parallel to the associated collecting conductor; and
   a coolant flow path directing coolant into contact with the stator windings; the respective collecting conductors being disposed in the coolant flow path electrically isolated from each other and spaced apart from each other and from the windings;
   wherein the collecting conductors each comprise a continuous conductive ring, each of the rings respectively having a different diameter; and
   wherein the respective conductive rings are disposed concentrically, axially displaced from each other.

2. The apparatus of claim 1 further including a respective output terminal assembly associated with each conductive ring electrically connected to the ring at a single point such that current provided from individual windings connected at different positions on the ring relative to the terminal assembly connection point take one of two paths delineated by the connection point of the output terminal assembly and a point on the ring at approximately 180 degrees from the connection point.

3. The apparatus of claim 1 wherein the terminal assembly includes a conducting stud and a fusible link electrically connected between the stud and associated conductive ring.

4. The apparatus of claim 1 further including a nonconducting mounting structure cooperating with the conductive rings to maintain the rings in predetermined disposition.

5. The apparatus of claim 4 wherein the mounting structure maintains the sets of rings concentrically and axially to expose the rings to cooling fluid at ambient inlet temperatures.

6. The apparatus of claim 1 wherein the rings are formed of rod stock with ends connected.

7. The apparatus of claim 1 wherein the rings are formed by stamping from a sheet of conductive material.

8. The apparatus of claim 1 wherein the rings are formed of rectangular stock.

9. The apparatus of claim 1 further including a nonconducting mounting structure cooperating with the collecting conductors to maintain the conductors in predetermined disposition.

10. The apparatus of claim 1 wherein the collecting conductors are uninsulated to facilitate cooling.

11. The apparatus of claim 1 wherein the rings are relatively rigid such that they maintain their shape during accelerations encountered during normal operation.

12. The apparatus of claim 1 wherein a coolant flow path includes a passage through the stator core and a passage through the rotor.

13. The apparatus of claim 1 wherein the individual conductive windings are of relatively small diameter such that a short-circuit conditions in an individual winding will cause the individual winding to melt and clear the short-circuit.

14. Compact, high power, power conversion apparatus comprising:
   a rotor comprising a cylindrical casing, and a predetermined number of permanent magnets disposed on the casing, the rotor being adapted for rotation about the axis of the casing,
   a stator comprising a core and a plurality of sets of conductive windings, each set including a predetermined number of individual conductive windings and associated with an electrical phase;
   a respective collecting conductor associated with each set of conductive windings, each individual conductive winding of the set being electrically connected in parallel to the associated collecting conductor; and
   a coolant flow path directing coolant into contact with the stator windings; the respective collecting conductors each comprising a conductive ring and each being disposed in the coolant flow path electrically isolated from each other and spaced apart from each other and from the windings;
   a respective output terminal assembly associated with each conductive ring electrically connected to the ring at a single point such that current provided from individual windings connected at different positions on the ring relative to the terminal assembly connection point take one of two paths delineated by the connection point of the output terminal assembly and a point on the ring at approximately 180 degrees from the connection point, wherein the terminal assembly includes a conducting stud and a fusible link electrically connected between the stud and associated conductive ring.

15. The apparatus of claim 14 wherein the respective conductive rings:
   are of different diameters;
   are disposed concentrically; and
   are axially displaced from each other.

16. The apparatus of claim 14 further including a nonconducting mounting structure cooperating with the conductive rings to maintain the rings in predetermined disposition.

17. The apparatus of claim 14 wherein the collecting conductors are uninsulated.

18. The apparatus of claim 14 wherein a coolant flow path includes a passage through the stator core and a passage through the rotor.

19. The apparatus of claim 14 wherein the individual conductive windings are of relatively small diameter such that a short-circuit conditions in an individual winding will cause the individual winding to melt and clear the short-circuit.

20. Compact, high power, power conversion apparatus comprising:
   a rotor comprising a cylindrical casing, and a predetermined number of permanent magnets disposed on the casing, the rotor being adapted for rotation about the axis of the casing,
   a stator comprising a core and a plurality of sets of conductive windings, each set including a predetermined number of individual conductive windings and associated with an electrical phase;
   a respective collecting conductor associated with each set of conductive windings, each individual conductive winding of the set being electrically connected in parallel to the associated collecting conductor; and
   a coolant flow path directing coolant into contact with the stator windings; the respective collecting conductors each the collecting conductors each comprise a continuous conductive ring and each being disposed in the coolant flow path electrically isolated from each other and spaced apart from each other and from the windings;
   a nonconducting mounting structure cooperating with the conductive rings to maintain the rings in predetermined disposition; and
   wherein the mounting structure maintains the sets of rings concentrically and axially to expose the rings to cooling fluid at ambient inlet temperatures.

21. The apparatus of claim 20 further including a respective output terminal assembly associated with each conductive ring electrically connected to the ring at a single point such that current provided from individual windings connected at different positions on the ring relative to the terminal assembly connection point take one of two paths delineated by the connection point of the output terminal assembly and a point on the ring at approximately 180 degrees from the connection point.

22. The apparatus of claim 20 wherein the respective conductive rings are of different diameters to facilitate cooling.

23. The apparatus of claim 20 wherein the respective conductive rings are disposed concentrically, axially displaced from each other.

24. The apparatus of claim 20 wherein the collecting conductors are uninsulated.

25. The apparatus of claim 20 wherein a coolant flow path includes a passage through the stator core and a passage through the rotor.

26. The apparatus of claim 20 wherein the individual conductive windings are of relatively small diameter such that a short-circuit conditions in an individual winding will cause the individual winding to melt and clear the short-circuit.

27. The apparatus of claim 20 wherein the rings are relatively rigid such that they maintain their shape during accelerations encountered during normal operation.

28. The apparatus of claim 20 wherein the rings are formed of rod stock with ends connected.

29. The apparatus of claim 20 wherein the rings are formed by stamping from a sheet of conductive material.

30. The apparatus of claim 20 wherein the rings are formed of rectangular stock.

* * * * *